June 14, 1960 W. B. GREENLEE ET AL 2,941,081
STELLAR ORIENTATION DETECTOR
Filed Sept. 27, 1950 2 Sheets-Sheet 1

*INVENTORS*
WILLIAM B. GREENLEE
VICTOR A. MILLER
BY
*William P. Lane*
ATTORNEY

June 14, 1960 W. B. GREENLEE ET AL 2,941,081
STELLAR ORIENTATION DETECTOR
Filed Sept. 27, 1950 2 Sheets-Sheet 2
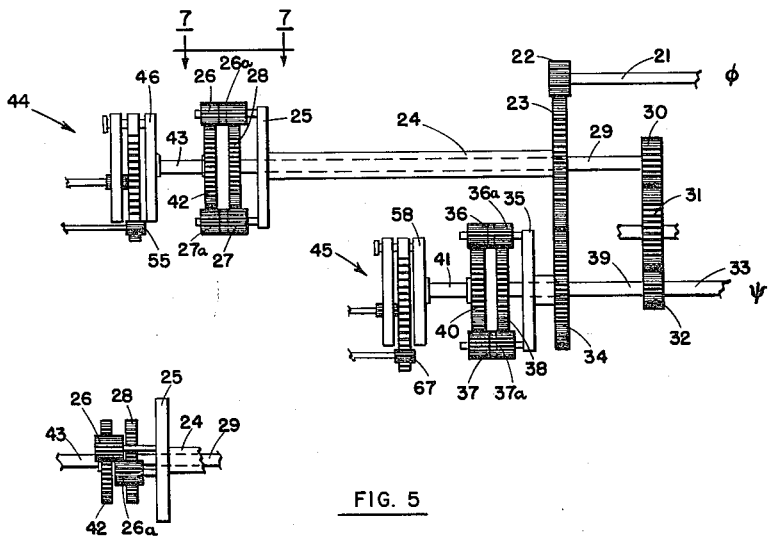
FIG. 5
FIG. 7
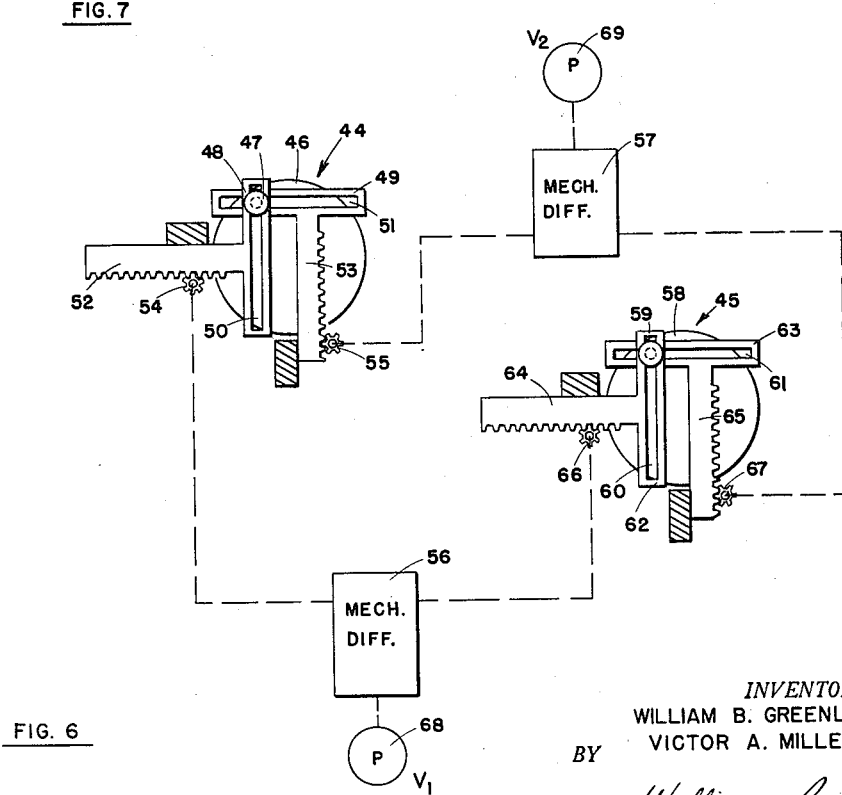
FIG. 6
*INVENTORS*
WILLIAM B. GREENLEE
VICTOR A. MILLER
BY
*William R. Lane*
ATTORNEY

United States Patent Office 2,941,081
Patented June 14, 1960

2,941,081

STELLAR ORIENTATION DETECTOR

William B. Greenlee, Downey, and Victor A. Miller, Long Beach, Calif., assignors to North American Aviation, Inc.

Filed Sept. 27, 1950, Ser. No. 186,962

17 Claims. (Cl. 250—203)

This invention pertains to the detection of light from a star, and particularly to the alignment of an optical axis with the line of sight to a star and the detection of the amount and direction of the deviation of an optical axis from a line of sight to a star.

This invention contemplates a system for relating the angular position of an optical axis to the line of sight to a star. In the use of light from stars for the automatic navigation of ships or aircraft it has proved possible to use photoelectric means for detecting the presence of a star within the field of vision of the optical system employed for gathering starlight. However, a serious problem exists in aligning the optical axis of the telescope or other optical apparatus employed with a line of sight to a star and correcting small angular deviations between the optical axis and the line of sight. In order to determine in what direction a star image is displaced from an optical axis, it has been proposed to modulate the light received through the optical system by means of a rotating reticle and cast the modulated light on a photocell. In this connection reference is made to application Serial No. 173,146 entitled "Star Sensing System," filed July 11, 1950, in the name of William B. Greenlee and Victor A. Miller. A phase comparison of the modulated signal with a reference signal indicates in what direction the star image is displaced from the optical axis. However, it is desirable for navigation purposes to know not only the direction of such deviation but also, at least roughly, the amount thereof in order that the proper amount of correction in orientation may be applied to the telescope optical axis.

Another problem encountered is that of sky gradient signal. Though the background sky light is of relatively low intensity during the night, its intensity is much greater during daylight hours. Furthermore, except in that part of the sky included in a 30° cone around the line of sight to the sun, the sky light varies as much as 3 percent per degree over the field of view of a telescope of the type which may be used to detect stars, and may be assumed to vary linearly. This variation in sky light may produce a modulated signal on a photocell similar to that caused by a star in the field, thus falsely indicating the presence of a star. The effect of sky light must therefore be reduced to a negligible value if possible and false signals generated because of variations in sky light, i.e., sky gradient, must be eliminated.

It is therefore an object of this invention to provide a star sensing system adapted to yield an electrical signal indicative of the magnitude and direction of the deviation of an optical axis from the line of sight to a celestial body.

It is another object of this invention to provide a star sensing system adapted to yield an electrical signal which may be used to correct the orientation of an optical axis to coincide with the line of sight to a celestial body.

Another object of this invention is to provide a star sensing system in which the effect of sky gradient signals is substantially eliminated.

Other objects of invention will become apparent from the following description, taken in connection with the accompanying drawings, in which Fig. 1 is a schematic elevational view of the invention;

Fig. 5 is a detailed schematic of a computer of this invention;

Fig. 6 is a combined electrical diagram and end view of the device shown in Fig. 5; and Fig. 7 is a detailed view taken at line 7—7 in Fig. 5

Figure 1:
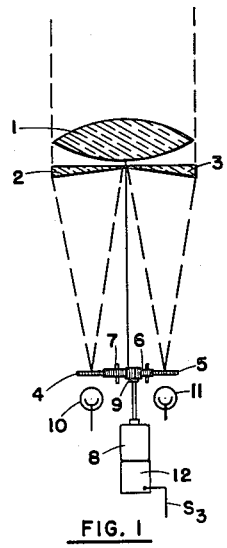
Figure 2:
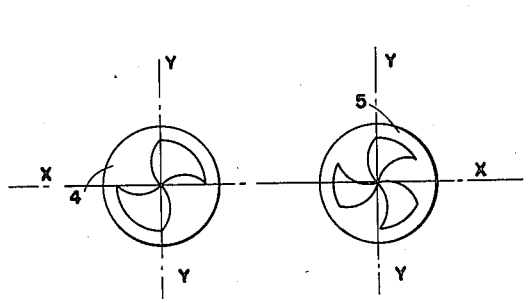
Fig. 2 represents a plan view of reticles employed in this invention.
Figure 3:
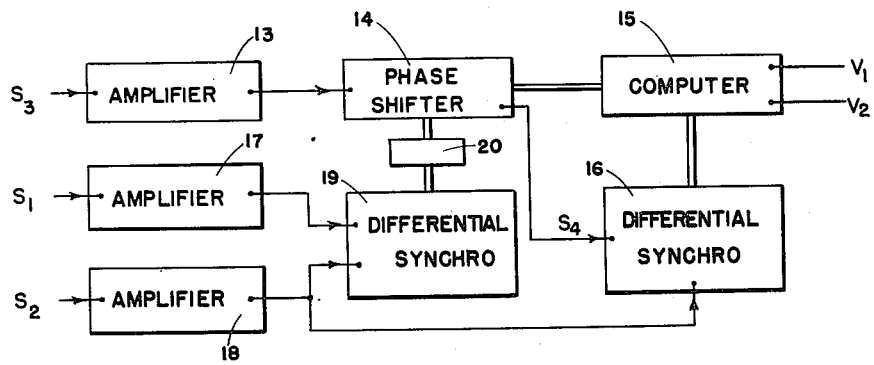
Fig. 3 is a block diagram of the electrical circuit of this invention.

Referring to Fig. 1, light from a star and from the sky immediately surrounding the star is gathered by a lens 1 and split by prisms 2 and 3 into two parallel light beams. These two beams fall on reticles 4 and 5 which are rotated by means of gears 6 and 7 in turn driven by motor 8 and gear 9. Reticles 4 and 5 are shown in plan view in Fig. 2. Gears 6 and 7 are of differing size, as is shown in Fig. 1, so that reticle 5 may be driven at two-thirds the speed of reticle 4. Light from reticles 4 and 5 falls upon photocells 10 and 11, respectively, which generate alternating current signals in response to the modulated light which falls upon them. A reference generator 12 is driven by motor 8 and furnishes a reference frequency $S_3$. Althernating current signals $S_1$ and $S_2$ are generated by photocells 11 and 10, respectively. In Fig. 3 the signal from reference generator 12 is fed to amplifier 13 and thence to phase shifter 14 mechanically connected to computer 15. From phase shifter 14 a modified signal is fed to differential synchro 16. Photocell signals are fed to amplifiers 17 and 18 and from there to differential synchro 19. A signal from amplifier 18 is fed to differential synchro 16, as shown in Fig. 3.

In operation, light from the star is chopped by reticles 4 and 5 which are so constructed as to incorporate alternate transparent and opaque portions, the boundaries of which are Archimedes spirals having the formula $R=k\theta$, where R is the radius to any point on the curve from the center of the reticle; $\theta$ is the angle between said radius and some reference axis; and $k$ is a constant of proportionality, hereinafter referred to as the "spiral curvature" of the spiral. It will be noted from Fig. 2 that reticle 4 comprises a two-lobed spiral, while reticle 5 has three lobes. Likewise, from Fig. 1 it will be noted that reticle 5 is driven at two-thirds the speed with which reticle 4 is driven, with the result that the signals generated by both photocells have the same frequency. In the following analysis, $k$ for the spiral of the three-lobed reticle will be arbitrarily assigned the value of K, while $\theta$ for the same reticle and a particular location of the star in the field will be designated by $\phi$. The value of $k$ for the two-lobed spiral must be ⅔ K.

Referring now to Fig. 3, the signal output of photocell 11 fed to amplifier 17 may be represented by $$S_1 = \sin 3(2\omega t + \phi + \psi) = \sin (6\omega t + 3\phi + 3\psi)$$

The signal fed to amplifier 18 from photocell 10 may be represented by $$S_2 = \sin 2(3\omega t + \tfrac{3}{2}\phi + \psi) = \sin (6\omega t + 3\phi + 2\psi)$$

in which $2\omega$ is the frequency of rotation of the three-lobed disc; $t$ is time, measured from an instant when the tangents to the leading edges of transparent portions of each reticle near the origins are coincident with the positive y-axis; $\phi$ is the phase shift due to spiral curvature of the sectors; and $\psi$ is the star image angle measured clockwise from the positive y-axis as shown in Fig. 2. The axes shown in Fig. 2 are associated with the field, it being understood that the reticles spin counterclockwise with respect to these axes.

These two signals are fed to differential synchro 19 whose shaft output, of course when properly indexed, is the phase difference between $S_1$ and $S_2$, or simply $\psi$. It now becomes apparent that unless the spiral curvatures $k$ for the spirals of the two reticles bear a ratio equal to the reciprocal of the ratio of the respective rotational speeds of the reticles the middle terms of the equations for $S_1$ and $S_2$ would not subtract out in the differential synchro. This shaft output is connected to phase shifter 14. Phase shifter 14 also receives a signal $S_3$ from reference generator 12 equal to sin $6\omega t$. The output shaft of differential synchro 19 is connected to phase shifter 14 by gear box 20 having a 2:1 ratio so that phase shifter 14 receives a rotation that shifts $S_3$ by an amount $2\psi$. A signal $S_4 = \sin(6\omega t + 2\psi)$ is therefore formed and fed to differential synchro 16. Differential synchro 16 also receives signal $S_2$ so that the shaft output of differential synchro 16 is $3\phi$, being the phase difference between $S_2$ and $S_4$. Computer 15 therefore receives two shaft inputs proportional to $\phi$ and $\psi$ from which coordinates of the star image in the telescope field may be computed.

The formulas for the coordinates of the star image in the telescope field are:

$$y = K\phi \cos \psi$$
$$x = K\phi \sin \psi$$

To simplify computation of corrections of telescope orientation and to obtain a signal from which the deviation of the star image from the center of the field may be obtained, $\phi$ and $\psi$ are fed into mechanical computer 15 shown in Fig. 6, which takes the sum and difference of these two rotations and resolves them into sines and cosines; i.e., $$\sin(\psi+\phi), \cos(\psi-\phi), \sin((\psi-\phi), \cos(\psi+\phi)$$

Thereafter the differences give $$\sin(\psi+\phi) - \sin(\psi-\phi) = 2 \sin\phi \cos\psi = V_1$$
$$\cos(\psi-\phi) - \cos(\psi+\phi) = 2 \sin\phi \sin\psi = V_2$$

For small rotations sin $\phi$ approximates $\phi$, so it is practicable to use these signals to accomplish $y$ and $x$ corrections, respectively. In general, $V_1$ and $V_2$ need to be accurate only near the center of the field; therefore, this approximation is justified.

Referring to Fig. 5, there is shown a schematic view of computer 15. Shaft 21, driven by differential synchro 16 with an angular displacement $\phi$ drives gear 22 which in turn drives gear 23 with an angular displacement of $-\phi$. Gear 23 is attached to shaft 24 which is integral with frame 25 having spur gears 26a and 27 freely rotatable thereon. Gear 28 meshing with gears 26a and 27 is free to rotate on shaft 24, and is attached by means of shaft 29 to gear 30. Gears 26a and 27 mesh with gears 26 and 27a also carried as spur gears on frame 25. Gears 26 and 27a drive gear 42 attached to shaft 43. Gear 30 meshes with idler gear 31 which in turn is driven by gear 32 attached to shaft 33 which is driven by phase shifter 14 in Fig. 3, with an angular displacement of $\psi$. Gear 23 meshes with gear 34 attached to frame 35 having spur gears 36a and 37a rotatable thereon, and gears 36a and 37a mesh with gears 36 and 37. Gears 36 and 37 in turn mesh with gear 38 which is attached to shaft 39 rotatable in frame 35 and attached to gear 32. Gear 38 is therefore driven with an angular displacement of $\psi$. Gear 40 is the output gear and is driven by gears 36 and 37 which, together with their associated gears and the frame, constitute a spur gear differential. Rotation of gear 40, it can therefore be seen, is the sum of rotations $\phi$ and $\psi$, since $\phi$ is furnished as a rotation to the frame of the spur gear differential, and $\psi$ is furnished as the rotation of gear 38. Shaft 41 therefore turns an angular distance $(\phi+\psi)$. Likewise, since shaft 24 turns at $-\phi$, and shaft 29 at $\psi$, output gear 42 turns at $(\psi-\phi)$, as does shaft 43. Resolvers 44 and 45 are connected to shafts 43 and 41, respectively, for the purpose of producing a displacement proportional to the sines and cosines of the rotations of shafts 43 and 41.

Fig. 6 shows resolvers 44 and 45 viewed from their ends, together with the electromechanical connection between them. Resolver 44 comprises a wheel 46 to which is attached a crank 47 slidable in cross arms 48 and 49 which are restrained to move only in the direction normal to the slots 50 and 51 of the cross arms. Cross arms 48 and 49 are integrally attached to racks 52 and 53 which drive gears 54 and 55, respectively; which gears are mechanically connected by any suitable device to mechanical differentials 56 and 57. In a similar fashion, resolver 45 comprises a wheel 58 having a crank 59 movable in slots 60 and 61, of cross arms 62 and 63 restrained against movement in any direction other than normal to the longitudinal direction of slots 60 and 61. Racks 64 and 65 turn gears 66 and 67, respectively, which in turn are mechanically connected to mechanical differentials 56 and 57. Mechanical differential 56 is mechanically connected to rotate potentiometer 68, and mechanical differential 57 is mechanically connected to rotate potentiometer 69.

In operation, the output of shaft 41 is an angular distance proportional to $(\psi+\phi)$, while the angular rotation of shaft 43 is proportional to $(\psi-\phi)$. The rotation of gear 54 is therefore proportional to the sine of $(\psi-\phi)$; the rotation of gear 55 is proportional to the cosine of $(\psi-\phi)$; the rotation of gear 56 is proportional to the sine of $(\psi+\phi)$; and the rotation of gear 67 is proportional to the cosine of $(\psi+\phi)$. Gears 55 and 67 are connected as inputs to a mechanical differential 57 whose output turns potentiometer 69. Potentiometer 69 therefore has an angular rotation proportional to cosine $(\psi-\phi)$ − cosine $(\psi-\phi)$, which may be transformed in accordance with a well-known trigonometric identity to the expression 2 $\sin\phi \sin\psi$. In a similar manner, gears 54 and 66 are connected to the input of mechanical differential 56 whose output turns potentiometer 68. Potentiometer 68 therefore experiences an angular rotation proportional to $\sin(\psi+\phi) - \sin(\psi-\phi)$, which may be transformed in accordance with a well-known trigonometric identity to 2 $\sin\phi \cos\psi$.

Computer 15, it will be appreciated, may be replaced by well-known mechanical computer components which may be varied considerably in form to achieve the same result. For instance, resolvers 44 and 45 may be replaced by such resolvers as those shown in Figs. 1.15 and 1.16 on pages 17 and 18 of "Computing Mechanisms and Linkages," by Antonin Svoboda. Similarly, the spur gear differentials of which gears 26 and 36 are a part may be replaced by a spur gear differential such as is shown in Fig. 1.3 on page 8 of the same publication. Mechanical differentials 56 and 57 represent conventional differentials such as the ones shown in Fig. 1.5 on page 9 of the above publication. The end result attained by computer 15, as previously noted, are two voltages proportional to $$V_1 = 2 \sin\phi \cos\psi$$
$$V_2 = 2 \sin\phi \sin\psi$$

These voltages may then be used as correction voltages for changing the orientation of the telescope so that the optical axis of the telescope coincides with the line of sight to the star being sighted. It will be noted that as these corrections decrease in magnitude, the quantity 2 $\sin\phi \cos\psi$ approaches $K\phi \cos\psi$, and the quantity 2 $\sin\phi \sin\psi$ approaches $K\phi \sin\psi$.

Figure 4:
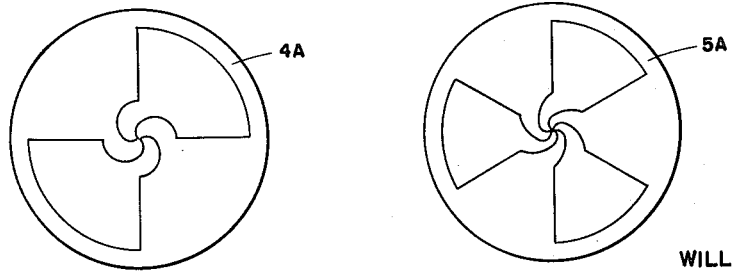
Fig. 4 is a plan view of a somewhat modified form of the reticles shown in Fig. 2.

Since, in general, it is not required to know the magnitude of correction required except where the correction becomes small, the reticles 4a and 5a shown in Fig. 4 may be used. In these reticles the spiral portion of the reticles occupies only the central portion thereof, and the remainder of the reticles is merely sector-shaped. This configuration results in a somewhat higher sensitivity and greater accuracy over a small central position of the field. It should be further pointed out that the spiral and radial sectors heretofore disclosed may be varied somewhat in shape so long as the centroid of the transparent areas of the reticle falls on the axis of rotation thereof. The spiral configuration is expedient because it simplifies the computer required to yield quantitative information for correction of the telescope orientation. So long as the centroid of the transparent areas of the reticle falls on the axis of rotation the effects of sky illumination and the first order terms of sky gradient are eliminated. In other words, the modulation effect of a uniform sky background light as well as that due to a linearly varying sky background light are both eliminated by virtue of the fact that the centroid of the area coincides with the axis of rotation of the reticle.

If $E_0$ represents a uniform sky illumination, the total illumination, neglecting higher than first order terms because of their negligible comparative size, may be represented by $$E = E_0 + E_1 x + E_2 y$$

where $E_1$ and $E_2$ or constants, and $x$ and $y$ are measured from the axis of rotation, as indicated in Fig. 2. The total flux to the photocell then would be $$F = \int_A E \, dA = \int_A E_0 \, dA + \int_A E_1 x \, dA + \int_A E_2 y \, dA$$

where $dA$ represents a differential area of the field. Apparently, if $\int_A x \, dA$ and $\int_A y \, dA$ are zero, F will be a constant. If the flux is constant, the photocell will generate no varying signal on account of the sky light or linear sky light gradient. But if these terms are zero, the centroid of the area is coincident with the axis of rotation of the reticle.

Although the invention has been described and illustrated in detail, it is to be clearly understood that the same is by way of illustration and example only and is not to be taken by way of limitation, the spirit and scope of this invention being limited only by the terms of the appended claims.

We claim:

1. In a star sensing system means for producing voltages indicative of the deviation of an optical axis from the line of sight to a star comprising an optical system for gathering light from a star, optical means for splitting said light into two beams, a first rotatable reticle having two symmetrically-disposed spiral-boundaried transparent sectors in the path of one of said beams of light, a second rotatable reticle having three symmetrically-disposed spiral-boundaried transparent sectors in the path of the other of said two beams of light, said last-named spirals having a spiral curvature one and one-half times as great as the spirals of said first reticle, means for rotating said second reticle at two-thirds the angular velocity of said first rotating reticle, means associated with said drive means for generating an alternating current signal proportional in frequency to the speed of said drive means, a first photoelectric cell adapted to receive light from said first reticle, a second photoelectric cell adapted to receive light from said second reticle, differential synchro means for subtracting the signals received from said two photoelectric cells, phase shifter means connected to the ouput of said differential synchro means and to the output of said generator means, a second differential synchro connected to the outputs of said second photoelectric cell and said phase shifter means, and computer means connected to the output of said phase shifter means and to the output of said differential synchro means for producing voltages indicative of the magnitude and direction of the deviation of a line of sight to said star from the optical axis of said optical means.

2. Means for detecting the deviation of a line of sight to a star from an optical axis comprising an optical system for gathering light from said star, optical means for splitting said light into two similar beams, a first rotated reticle having two symmetrically-disposed sector-shaped transparent areas whose centroid coincides with the axis of rotation thereof, a second rotating reticle in the other of said light beams having three symmetrically-disposed sector-shaped transparent areas whose centroid coincides with the axis of rotation thereof rotated at two-thirds the speed of rotation of said first rotated reticle, said reticles being characterized by having their transparent areas bounded by Archimedes spirals in at least their central portion, the spiral of said first-named reticle having a spiral curvature two-thirds that of said second reticle, a photoelectric cell for producing an alternating current signal in response to the modulated light falling upon it from said first reticle, a second photoelectric cell for producing an alternating current signal in response to modulated light falling upon it from said second rotated reticle, reference generator means for producing an electrical alternating current signal proportional in frequency to the speed of rotation of said reticles, and computer means responsive to said alternating current signals for producing voltages proportional to the coordinates of displacement of the image of said star in the field of said optical system.

3. Star sensing means comprising an optical system having a field and an optical axis for gathering light from a star and splitting it into two simliar beams, means for transmitting unmodulated the background light from the sky adjacent said star and for modulating the starlight in said two beams at different frequencies and with a phase relation dependent upon both the magnitude and sense of the displacement of the image of said star from the center of said field, two photocells for generating electrical signals in response to said beams of light, and means responsive to said photocell signals for generating voltages whose phase is proportional to the deviation of said optical axis from a line of sight to said star.

4. A device as recited in claim 3 in which said modulating means comprise two rotating reticles, the centroid of whose transparent areas falls at the axis of rotation thereof; and means for rotating said reticles at predetermined constant speed to thereby eliminate the effect of sky gradient.

5. A device as recited in claim 3 in which said modulating means comprise two rotating reticles having transparent areas the combined centroids of which coincide wtih their axes of rotation and whose transparent areas are bounded by Archimedes spirals to thereby modulate the light from said star with the phase relation depending upon the displacement of the image of said star from the center of said field.

6. A device as recited in claim 3 in which said modulating means comprise two rotating reticles having transparent areas bounded by Archimedes spirals whose centroid coincides with the axis of rotation of said reticles and in which said reticles are rotated at predetermined differing constant speeds to thereby modulate the light in said two beams with a phase relation dependent upon the magnitude and sense of the displacement of the image of said star from the center of said field.

7. Star sensing means comprising an optical system including optical means for splitting the light from a star into two similar beams, and a telescope having a field and an optical axis, a rotating reticle in each said beam of light, one of said reticles having two transparent areas bounded by Archimedes spirals the centroid of said areas being coincident with the axis of rotation of said reticle, a second reticle in the other of said beams having three transparent areas bounded by Archimedes spirals the spiral curvature of which differs from that of the Archimedes spirals of said first reticle, and the centroid of whose transparent areas coincides with the axis of rotation of said second reticle; means for rotating said reticles at predetremined constant differing speeds; and photocell means for producing electrical signals in response to the modulated light from each said beam of light whereby the phase relation of the light modulated by said reticles is indicative of the departure of said star image from the center of said field.

8. Star sensing means comprising an optical system including light beam splitting means for splitting the light from a star into two similar beams and a telescope having a field and an optical axis, rotating reticle means for modulating the light in each of said beams, each said rotatable reticle having transparent areas whose centroid coincides with the axis of rotation of said reticle and whose boundaries are Archimedes spirals of predetermined differing spiral curvatures in each said reticle, means for rotating said reticles at predetermined differing constant speeds, photocell means for generating electrical signals in response to said modulated light, and electrical means for generating voltages indicative of the deviation of a line of sight to said star from said optical axis in response to said photocell signals whereby said optical axes may be trained on said star.

9. In a star sensing device having a telescope for gathering light from a star, the combination of optical means for splitting the light gathered by said telescope into two similar beams, two photoelectric cells for generating electrical signals in response to the light in each of said beams, a rotatable reticle in one of said beams having two symmetrically-disposed congruent transparent areas whose boundaries are similar Archimedes spirals, a second rotatable reticle having three symmetrically-disposed congruent transparent areas whose boundaries are Archimedes spirals having spiral curvatures of predeterminately differing value from those of said first reticle and intersecting at the axis of rotation of said reticle, means for rotating said reticles at constant but predeterminately differing speeds, an alternating current generator adapted to yield a signal whose frequency corresponds to the speed of rotation of said reticles, and computer means for producing voltages indicative of the deviation of the line of sight to a star from the optical axis of said telescope in response to the signals from said photoelectric cells and said generator.

10. In a star sensing device having a telescope, means for modulating the light from a star in a manner indicative of the magnitude and direction of deviation of the line of sight to said star from the optical axis of said telescope comprising optical means for splitting the light from a star into two similar beams, a first rotatable reticle having two congruent transparent areas bounded by Archimedes spirals the centroid of said transparent areas being coincident with the axis of rotation of said reticle, a second rotatable reticle having three congruent transparent areas bounded by Archimedes spirals of predeterminately differing spiral curvature from the spirals in said first reticle, the centroid of said transparent areas being coincident with the axis of rotation of said reticle, and means for rotating said reticles at constant predetermined relative speeds to thereby modulate the light from said star so as to indicate the magnitude and direction of deviation of a line of sight to said star from the optical axis of said telescope.

11. In a star sensing device having an optical system which has a field and an optical axis for gathering light from a star and splitting it into two similar beams; means for modulating the light in each of said two beams comprising two rotating reticles each having a plurality of transparent areas bounded by curves whose radius vectors vary with the angular displacement of a point thereon in accordance with a predetermined function and whose centroid falls at the axis of rotation thereof, thereby eliminating the effect of sky intensity gradient; means for rotating said reticles at predetermined different constant speeds; two photocells for generating signals in response to said beams of light; and electronic means responsive to said photocell signals for generating voltages proportional to the deviation of said optical axis from a line of sight to said star.

12. In a star sensing device having an optical system with a field and an optical axis for gathering light from a star and splitting it into two similar beams; means for modulating the light in said two beams at different frequencies comprising two rotating reticles having transparent areas the combined centroids of which coincide with the axes of rotation of said reticles and whose transparent areas are bounded by Archimedes spirals; means for rotating said reticles at predetermined constant speed; two photocells for generating electrical signals in response to said beams of light with a phase relation dependent upon the magnitude and sense of the displacement of the image of said star from the center of said field; and electronic means responsive to said photocell signals for generating voltages proportional to the deviation of said optical axis from a line of sight to said star.

13. In a star sensing device having an optical system with a field and an optical axis for gathering light from a star and splitting it into two similar beams, means for modulating the light comprising two rotating reticles having transparent areas bounded by Archimedes spirals whose centroid coincides with the axis of rotation of said reticles and in which said reticles are rotated at predetermined differing constant speeds to thereby modulate the light in said two beams with a phase relation dependent upon the magnitude and sense of the displacement of the image of said star from the center of said field.

14. In a radiant energy sensing device having an optical system for gathering light from a radiant energy source the combination of optical means for gathering radiant energy, optical means for splitting said energy into two similar beams, two radiant energy sensing devices for generating electrical signals in response to the radiant energy in each of said beams, a rotatable reticle in one of said beams having two symmetrically disposed congruent transparent areas whose boundaries are similar Archimedes spirals, a second rotatable reticle having three symmetrically disposed congruent transparent areas whose boundaries are Archimedes spirals intersecting at the axis of rotation of said reticles having spiral curvatures of predeterminately differing value from those of said first reticle, means for rotating said reticles at constant but predeterminately different speeds, an alternating current generator adapted to yield a signal whose frequency corresponds to the speed of rotation of said reticles, and computer means for producing voltages indicative of the deviation of the line of sight to said radiant energy source from the optical axis of said optical system in response to the signals from said radiant energy detecting device and said generator.

15. In a radiant energy sensing device having an optical system, means for modulating the radiant energy from a radiant energy source in a manner indicative of the magnitude and direction of deviation of the line of sight to said radiant energy source from the optical axis of said optical system comprising optical means for splitting the radiant energy from a radiant energy source into two similar beams, a first rotatable reticle having two congruent transparent areas bounded by Archimedes spirals the centroid of said transparent areas being coincident with the axis of rotation of said reticle, a second rotatable reticle having three congruent transparent areas bounded by Archimedes spirals of predeterminately differing spiral curvature from the spirals in said first reticle, the centroid of said transparent areas being coincident with the axis of rotation of said reticle, and means for rotating said reticles at constant predetermined relative speeds to thereby modulate the radiant energy from said radiant energy source so as to indicate the magnitude and direction of deviation of a line of sight to said radiant energy source from the optical axis of said optical system.

16. In a star sensing device having a telescope for gathering light from a star, the combination of optical means for splitting the light gathered by said telescope into a plurality of similar beams, a plurality of photoelectric cells for generating electrical signals in response to the light in each of said beams, a rotatable reticle in each of said beams, each of said reticles being provided with a different plural number of symmetrically disposed congruent transparent areas whose boundaries in each of said reticles are similar Archimedes spirals intersecting at the axis of rotation thereof, the spiral curvature of the spirals on each of said reticles being of predeterminately different value from those of any other of said reticles and the centroid of the transparent areas of each of said reticles coinciding with the axis of rotation of said reticle, means for rotating said reticles at constant but predeterminately different speeds, an alternating current generator adapted to yield a signal whose frequency corresponds to the speed of rotation of said reticles, and computer means for producing voltages indicative of the deviation of the line of sight to a star from the optical axis of said telescope in response to the signals from said photoelectric cells and said generator.

17. In a star sensing system, a rotating reticle having a plurality of symmetrically disposed congruent transparent areas whose centroid is at the axis of rotation of said reticle, the boundaries of said transparent areas being similar Archimedes spirals whose spiral curvature has a predetermined value.

References Cited in the file of this patent
UNITED STATES PATENTS

| | | |
|---|---|---|
| 2,462,925 | Varian | Mar. 1, 1949 |
| 2,513,367 | Scott | July 4, 1950 |